(12) United States Patent
Park et al.

(10) Patent No.: US 8,379,713 B2
(45) Date of Patent: Feb. 19, 2013

(54) METHOD AND APPARATUS FOR DISPLAYING VIDEO DATA

(75) Inventors: Seong-joon Park, Seoul (KR); Choon-sik Jung, Hwaseong-si (KR); Man-seok Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1191 days.

(21) Appl. No.: 11/859,870

(22) Filed: Sep. 24, 2007

(65) Prior Publication Data

US 2008/0240256 A1 Oct. 2, 2008

(30) Foreign Application Priority Data

Mar. 27, 2007 (KR) .................. 10-2007-0030056

(51) Int. Cl.
*H04N 7/12* (2006.01)
(52) U.S. Cl. .................................. 375/240.01
(58) Field of Classification Search .......... 370/464, 370/465, 474; 375/240–240.29
See application file for complete search history.

(56) References Cited

U.S. PATENT DOCUMENTS

| | | | |
|---|---|---|---|
| 6,553,180 B1 * | 4/2003 | Kikuchi et al. .......... 386/241 |
| 7,091,968 B1 * | 8/2006 | Ludvig et al. .......... 725/39 |
| 7,224,891 B1 * | 5/2007 | Jam et al. .......... 386/232 |
| 7,409,141 B2 * | 8/2008 | Yamasaki .......... 386/326 |
| 7,483,622 B2 * | 1/2009 | Sugimura et al. .......... 386/248 |
| 7,634,788 B2 * | 12/2009 | Gordon et al. .......... 725/41 |
| 7,657,056 B2 * | 2/2010 | Kwon et al. .......... 382/100 |
| 7,836,467 B2 * | 11/2010 | Gordon et al. .......... 725/40 |
| 2007/0025699 A1 * | 2/2007 | Kim et al. .......... 386/95 |
| 2008/0134260 A1 * | 6/2008 | Glassman et al. .......... 725/104 |

FOREIGN PATENT DOCUMENTS

| KR | 10-2006-0122784 A | 11/2006 |
|---|---|---|
| WO | 2006/126852 A1 | 11/2006 |

OTHER PUBLICATIONS

Communication issued Mar. 3, 2011 from the Korean Patent Office in a counterpart application No. 10-2007-0030056.

* cited by examiner

*Primary Examiner* — Dmitry H Levitan
(74) *Attorney, Agent, or Firm* — Sughrue Mion, PLLC (57) ABSTRACT

Provided is a method and apparatus for displaying video data without a display delay. In the method, a code indicating an end of stream is appended so that the code is appended behind a last video stream included in a stream to be displayed when only a part of an input stream including one or more video streams is displayed. In addition, the last video stream is displayed which is appended with the code indicating an end of stream.

26 Claims, 12 Drawing Sheets

```
MPEG-2 Video Sequence_end_code
M2[188]=
{
0x47, 0x50, 0x11, 0x10, 0x00, 0x00, 0x01, 0xE0, 0x00, 0x00, 0x84, 0x00, 0xAB, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0x00, 0x00, 0x01, 0xB7
};
```

FIG. 9

```
H.264 Video End_Of_Sequence
h264[188]=
{
0x47, 0x50, 0x11, 0x10, 0x00, 0x00, 0x01, 0xE0, 0x00, 0x00, 0x84, 0x00, 0xAB, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
0xFF, 0xFF, 0xFF, 0xFF, 0xFF, 0xFF, 0xFF, 0xFF, 0x00, 0x00, 0x00, 0x01, 0x0A
};
```

FIG. 10

```
SMPTE-VC1 Video End_Of_Sequence
VC1 [188]=
{
    0x47, 0x50, 0x11, 0x10, 0x00, 0x00, 0x0A, 0xE0, 0x00, 0x00, 0x84, 0x00, 0xAB, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0xFF, 0xFF, 0xFF, 0xFF, 0xFF, 0xFF, 0xFF, 0xFF,
    0xFF, 0xFF, 0xFF, 0xFF, 0xFF, 0xFF, 0xFF, 0x00, 0x00, 0x00, 0x01, 0x0A
};
```

```
while(1)
{
    sleep(16msec) ;                                    // (1310) OPERATION IS CONTINUED WHILE
                                                       //        MEDIA FILE IS DISPLAYED
    videoPTS = GetCurrentVideoPTS();                   // (1320) CODE IS PERIODICALLY EXECUTED AND WAITED
    videoSTC = GetCurrentSTC();                        // (1330) PTS VALUE OF PICTURE CURRENTLY
                                                       //        BEING DISPLAYED ON SCREEN IS OBTAINED
    nextPTS =                                          // (1340) SYSTEM CLOCK VALUE IS OBTAINED
      GetNextPTSFromNavigation(videoPTS);              // (1350) PTS VALUE OF PICTURE TO BE NEXT DISPLAYED
                                                       //        IS OBTAINED USING NAVIGATION INFORMATION
                                                       //        (CLIP INFORMATION)
    if( nextPTS==0xFFFFFFFF)
        continue;  // don't need to flush video buffer // (1322) IF PTS VALUE CANNOT BE OBTAINED USING
                                                       //        NAVIGATION INFORMATION, CONTROLLER IS
    if( abs(nextPTS - videoPTS) < 2 sec )              //        NOT OPERATED AND IS WAITED
        continue;
                                                       // (1324) IF DIFFERENCE BETWEEN PTS OF CURRENT
    if( flushedPTS==nextPTS)                           //        PICTURE AND PTS OF NEXT PICTURE IS
        continue;                                      //        2 SECONDS OR LESS, CONTROLLER IS NOT
    if( (nextPTS - 30 msec)< videoSTC                  //        OPERATED AND IS WAITED (CONTROL OPERATION
          < (nextPTS + 30 msec) )                      //        IS NOT REQUIRED FOR GENERAL VIDEO DATA)
    {
        VideoFlush();                                  // (1326) DUPLICATED CONTROL OPERATION IS
        flushedPTS=nextPTS;                            //        PREVENTED FOR THE SAME PICTURE
    }
}                                                      // (1360) IF DIFFERENCE BETWEEN CURRENT STC AND PTS
                                                       //        OBTAINED USING NAVIGATION INFORMATION IS
                                                       //        BELOW PREDETERMINED VALUE, VIDEO BUFFER IS
                                                       //        FLUSHED (DISPLAY BUFFER POINTER INCREASES),
                                                       //        CONTROLLER OPERATION CONDITION
```

FIG. 14

METHOD AND APPARATUS FOR DISPLAYING VIDEO DATA

CROSS-REFERENCE TO RELATED PATENT APPLICATIONS

This application claims the benefit of Korean Patent Application No. 10-2007-0030056, filed on Mar. 27, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a video data display, and more particularly, to a method and apparatus for displaying video data without a display delay that occurs in a video decoder that cannot detect an end of picture.

2. Description of the Related Art

Video decoders conventionally display a decoded picture by detecting a header of a next picture or by detecting a code indicating an end of stream (e.g., sequence end code (SED)/end of sequence (EOS)) rather than the end of picture. The term of SEC/EOS indicates the end of stream, where the SEC is used in the moving picture experts group (MPEG)-1/2 video data standards, and the EOS is used in the video codec (VC)-1 video data standard or the H.264 video data standard.

The reason why the video decoders operate as described above is that the end of the picture cannot be easily detected from a video elementary stream (ES). In general, video data is continuously displayed in response to a picture start code if one stream that amounts to tens of hours is continuously displayed. However, in some cases, for example, when a menu screen composed of one picture is used, or when a stream having a large video gap is used such as a slideshow application, decoded video data stored in a buffer cannot be displayed.

Accordingly, a display delay occurs when a time for displaying a picture on a screen is significantly different from a presentation time stamp (PTS) value of the picture. In general, the PTS value is allocated to respective pictures which are completed by combining one or more video streams.

Figure 1:
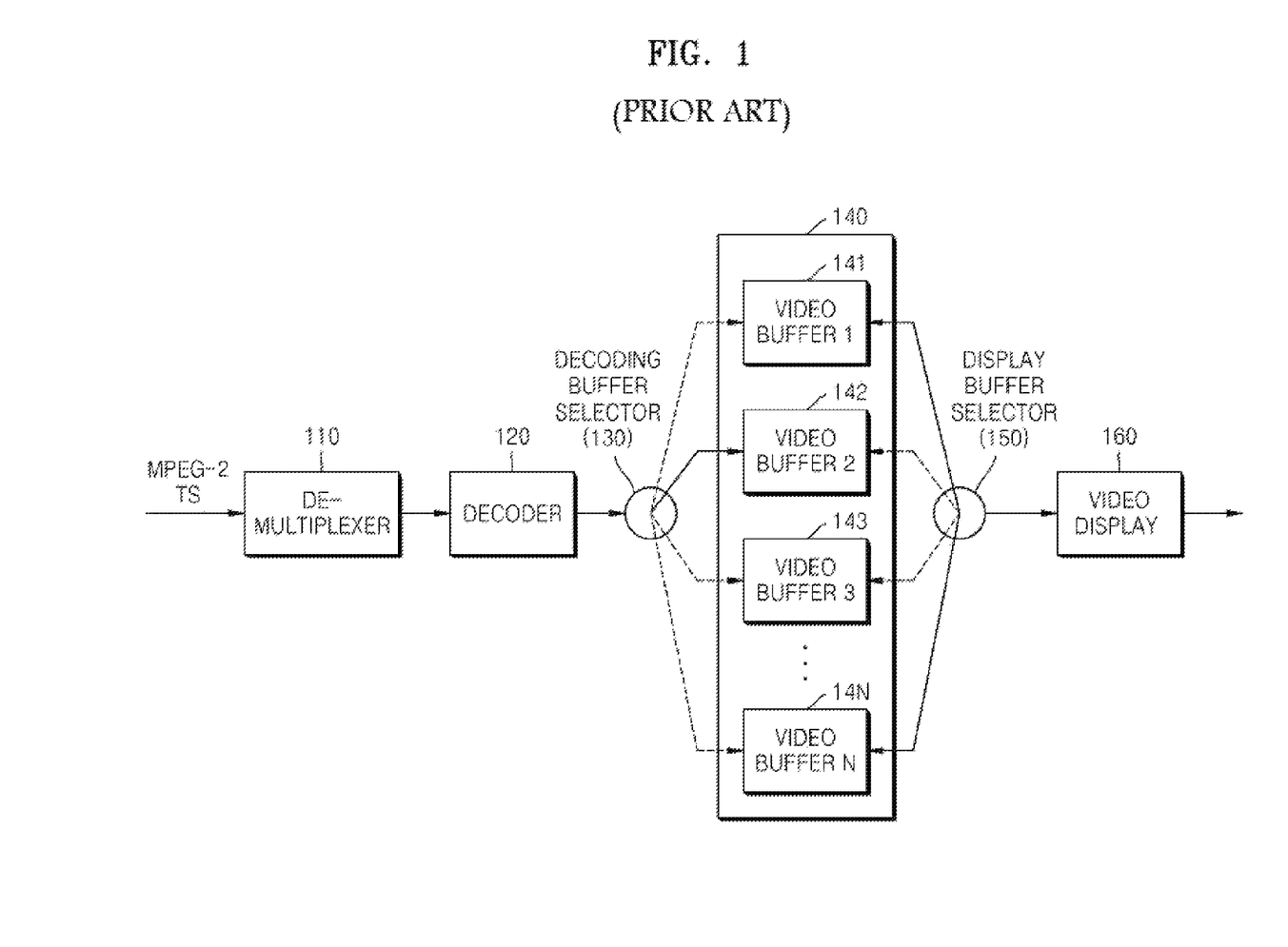
FIG. 1 is a block diagram of a conventional apparatus for displaying a moving picture experts group (MPEG)-2 transport stream (TS)

FIG. 1 is a block diagram of a conventional apparatus for displaying an MPEG-2 transport stream (TS).

Referring to FIG. 1, the apparatus includes a de-multiplexer 110, a decoder 120, a decoding buffer selector 130, a video buffer 140, a display buffer selector 150, and a video display 160.

The de-multiplexer 110 receives the MPEG-2 TS. The received MPEG-2 TS is sequentially transmitted to the decoder 120 according to an arrival time stamp (ATS).

The decoder 120 decodes the video data received from the de-multiplexer 110, thereby completing one picture.

The decoding buffer selector 130 selects any one of buffers 141 to 14N included in the video buffer 140 to store the decoded video data. The display buffer selector 150 selects any one of the buffers 141 to 14N storing the video data to be displayed on a screen.

The video display 160 displays on the screen the video data stored in any one of the buffers 141 to 14N selected by the display buffer selector 150.

According to the prior art, when a header of a next picture or an SEC/EOS is detected, the decoder 120 increments by 1 a pointer of the decoding buffer selector 130 and a pointer of the display buffer selector 150 so that the pointer of the display buffer selector 150 indicates a buffer that stores a picture to be displayed next.

For example, if a picture currently being displayed on the screen is in association with video data stored in the first video buffer 141, the pointer of the decoding buffer selector 130 indicates the second video buffer 142, and the pointer of the display buffer selector 150 indicates the first video buffer 141. The decoder 120 decodes the video data and then stores the decoded video data in the second buffer 142 indicated by the pointer of the decoding buffer selector 130.

In this case, when the decoder 120 detects the head of picture or the SEC/EOS, the decoding buffer selector 130 increments its pointer by 1, thereby indicating the third buffer 143. The display buffer selector 150 also increments its pointer by 1, thereby indicating the second video buffer 142. As a result, the video data stored in the second video buffer 142 is displayed. That is, the decoded video data stored in the video buffers 141 to 14N is updated at a moment when these buffers are indicated by the pointer of the display buffer selector 150.

The display buffer selector 150 is sequentially synchronized with the decoding buffer selector 130 so that only a completely decoded picture is displayed on the screen. To this end, the pointer of the display buffer selector 150 has to be different by 1 from the pointer of the decoding buffer selector 130.

Figure 7A:
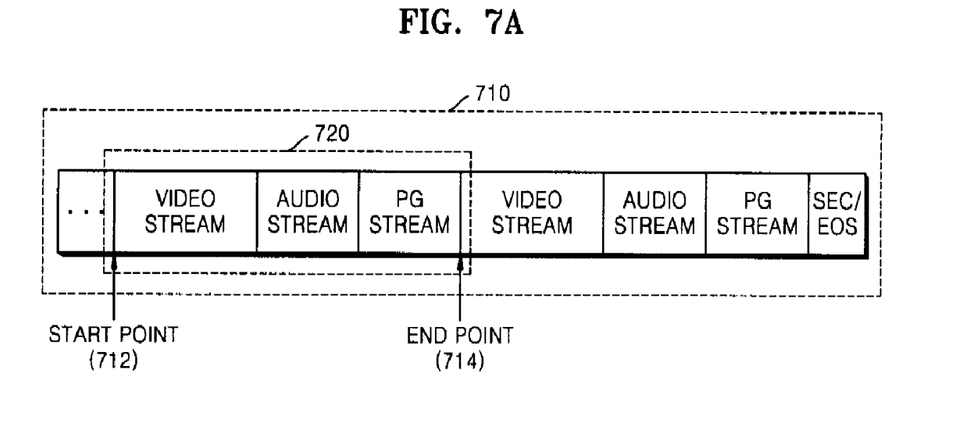
FIGS. 7A, 7B, and 7C illustrates an example of a method of appending an SEC/EOS according to an exemplary embodiment of the present invention.
Figure 7B:
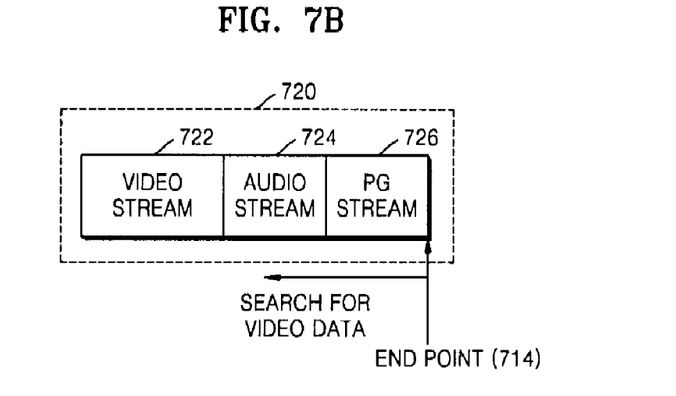

Referring to FIGS. 7A and 7B, when only a stream 720 included in an input stream 710 is displayed according to the prior art, the decoder 120 decodes a last video stream 722 included in the stream 720 to be displayed and then waits until a header of a next picture or an SEC/EOS is detected. Then, the decoded data, that is, the last video stream 722, is stored in the video buffer 140. Thus, the last video stream 722 is not displayed. That is, a display delay occurs in which certain video data is not displayed or is displayed with a time delay.

In order to implement a Blu-ray disc, which is one of applications of the present invention, a function is required whereby even a single picture can be timely displayed according to the PTS. However, since the conventional video decoder detects the header of the picture or the SEC/EOS rather than the end of picture, a display error occurs when the decoded picture is stored in a buffer and thus is not displayed on the screen for a certain period of time.

Figure 2:
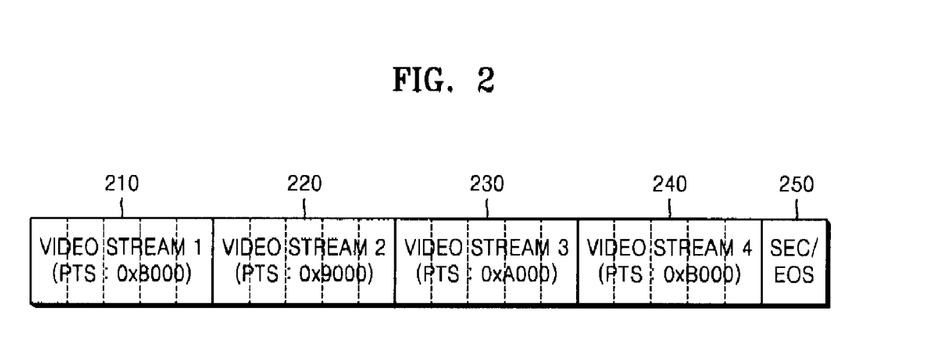
FIG. 2 illustrates an example of an MPEG-2 TS when a presentation time stamp (PTS) difference between consecutive pictures is large.

FIG. 2 illustrates an example of an MPEC-2 TS when a PTS difference between consecutive pictures is large.

Referring to FIG. 2, the MPEC-2 TS includes a first video stream 210, a second video stream 220, a third video stream 230, a fourth video stream 240, and an SEC/EOS 250. The PTS difference between the first video stream 210 and the second video stream 220 is significantly large. In this case, each stream may be used for a menu screen. That is, the respective streams of FIG. 2 are not continuously displayed but are used one by one as a separate menu screen.

For example, if a PTS value of the stream 210 to be used for a menu screen is 0x8000, an application reads only the stream 210 having a PTS value of 0x8000. In this case, the SEC/EOS 250 is not present behind the stream 210 having a PTS value of 0x8000. Immediately after data is read, the decoder 120 decodes the data and stores the data in the video buffer 140. The data is not displayed on a screen and rather remains in the video buffer 140 until the SEC/EOS 250 or a picture start code of a next picture is detected. Therefore, according to the prior art, a menu screen cannot be displayed when only a video decoder is used without any particular processing.

Figure 3:
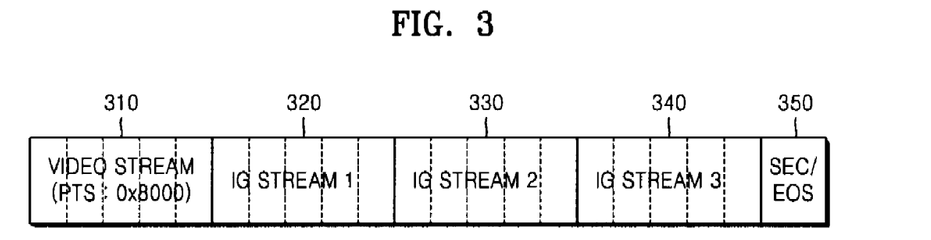
FIG. 3 illustrates an example of an MPEG-2 TS in which interactive graphic (IG) streams are present between a video stream and a sequence end code (SEC)

FIG. 3 illustrates an example of an MPEG-2 TS in which interactive graphic (IG) streams are present between a video stream and an SEC/EOS.

Referring to FIG. 3, the MPEG-2 TS includes a video stream 310, IG streams 320, 330, and 340, and an SEC/EOS 350.

Although the MPEG-2 TS is composed of one picture, the IG streams 320, 330, and 340 each having a significant data size are present between the SEC/EOS 350 and the video stream 310. In this case, as described above, the decoder 120 decodes video data immediately after the video data is received, and then stores the decoded video data in the video buffer 140. However, the stored video data is not displayed until a picture start code of the picture or the SEC/EOS 350 is detected.

Due to the appended IG streams 320, 330, and 340, the decoder 120 may detect the SEC/EOS 350 with a significant time delay. Such time delay may prevent the video data from being displayed according to an AV sync algorithm. Even if the video data is displayed, a display error may occur since a time for displaying the video data on the screen has a large discrepancy with respect to a PTS value of the picture.

As described above, the conventional video decoder detects a header of the picture or an SEC/EOS instead of an end of the picture. Thus, if a menu screen composed of one picture or a stream having a large video gap is displayed, or when only a part of an input stream is displayed, a display delay may occur when decoded video data stored in a buffer cannot be displayed.

SUMMARY OF THE INVENTION

The present invention provides a method and apparatus for displaying video data without a display delay.

According to an aspect of the present invention, there is provided a method of displaying video data, including: appending a code indicating an end of stream so that the code is appended behind a last video stream included in a stream to be displayed when only a part of an input stream including one or more video streams is displayed; and displaying the last video stream appended with the code indicating an end of stream.

The displaying of the last video stream may further include decoding video data corresponding to the last video stream appended with the code indicating an end of stream.

The video data may be input in an MPEG (moving picture experts group)-2 TS (transport stream) format.

The video data input in an MPEG-2 TS format may further include arrival time information.

Displaying only a part of the input stream may include a case that the decoded video data is the last video stream included in the stream to be displayed.

Displaying only a part of the input stream may include a case that display is scheduled to be end after a part of the input stream is displayed.

Displaying only a part of the input stream may include a case that a next stream is scheduled to be input after the part of input stream is displayed.

Displaying only a part of the input stream may include a case that a new stream is scheduled to be displayed after a stream currently being displayed stops being displayed.

The appending of a code indicating an end of stream may further include: extracting a start point and an end point of the stream to be displayed among the input stream; searching for reversely the last video stream from the end point; and appending the code indicating an end of stream so that the code is appended behind the found last video stream.

The appending of a code indicating an end of stream may further include copying arrival time information of the last video stream to arrival time information of the appended code indicating an end of stream.

The code indicating an end of stream may be SEC (sequence end code) or EOS (end of sequence).

The SEC or the EOS may be selected from the group consisting of an MPEG-2 SEC, a H.264 EOS, and VC (video codec)-1 EOS according to a video codec.

According to another aspect of the present invention, there is provided a method of displaying video data, including: decoding an input stream including one or more video streams; and comparing reproduction time information of a picture to be displayed next with system time information that is reference time information, and, if a difference therebetween is below a predetermined value, controlling video data, which is included in the decoded stream, to be displayed on a screen.

The system time information may be determined as reproduction time information of a start video picture of a stream to be displayed.

In the controlling of video data, reproduction time information of a picture currently being displayed may be compared with reproduction time information of a picture to be displayed next, and if a difference therebetween is below the predetermined value, the controlling may be no longer carried out and is delayed for a certain period of time.

According to another aspect of the present invention, there is provided an apparatus for displaying video data, including: a code appender appending a code indicating an end of stream so that the code is appended behind a last video stream included in a stream to be displayed when only a part of an input stream including one or more video streams is displayed; and a display displaying the last video stream appended with the code indicating an end of stream.

The apparatus may be a Blu-ray disc apparatus.

The apparatus may further include a decoder decoding video data corresponding to the last video stream appended with the code indicating an end of stream.

The video data may be input in an MPEG (moving picture experts group)-2 TS (transport stream) format.

The video data input in an MPEG-2 TS format may further include arrival time information.

Displaying only a part of the input stream may include a case that the decoded video data is the last video stream included in the stream to be displayed.

Displaying only a part of the input stream may include a case that display is scheduled to be end after a part of the input stream is displayed.

Displaying only a part of the input stream may include a case that a next stream is scheduled to be input after the part of the input stream is displayed.

Displaying only a part of the input stream may include a case that a new stream is scheduled to be displayed after a stream currently being displayed stops being displayed.

The code appender may extract a start point and an end point of the stream to be displayed among the input stream, searches for reversely the last video stream from the end point, and append the code indicating the end of stream so that the code is appended behind the found last video stream.

The code appender may further include a copy unit copying arrival time information of the last video stream to arrival time information of the appended code indicating an end of stream.

The code indicating an end of stream may be SEC (sequence end code) or EOS (end of sequence).

According to another aspect of the present invention, there is provided an apparatus for displaying video data, including:

a decoder decoding an input stream including one or more video streams; a controller comparing reproduction time information of a picture to be displayed next with system time information that is reference time information, and, if a difference therebetween is below a predetermined value, controlling video data, which is included in the decoded stream, to be displayed on a screen; and a display displaying the video data decoded by the decoder on a screen under the control of the controller.

The system time information may be determined as reproduction time information of a start video picture.

The controller may compare reproduction time information of a picture currently being displayed with reproduction time information of a picture to be displayed next, and, if a difference therebetween is below a predetermined value, does not operate and waits for a certain period of time.

According to another aspect of the present invention, there is provided a computer-readable medium having embodied thereon a computer program for executing the method of displaying video data, including: appending a code indicating an end of stream so that the code is appended behind a last video stream included in a stream to be displayed when only a part of an input stream including one or more video streams is displayed; and displaying the last video stream appended with the code indicating an end of stream.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, exemplary embodiments of the present invention will be described with reference to the accompanying drawings.

Figure 4:
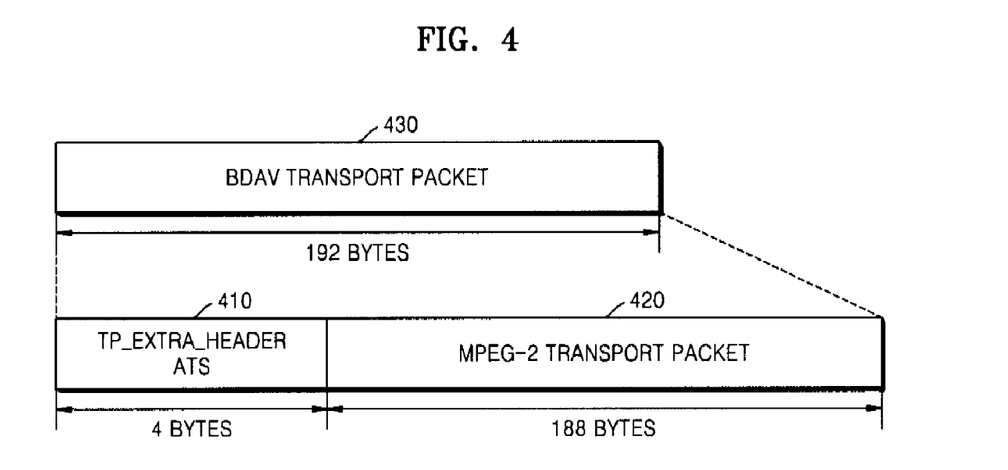
FIG. 4 illustrates a packet structure of Blu-ray audio and video (BDAV) MPEG-2 TS.

FIG. 4 illustrates a packet structure of Blu-ray audio and video (BDAV) moving picture experts group (MPEG)-2 transport stream (TS).

A Blu-ray disc (BD) is a representative application of the present invention. In the BD, a 4-byte arrival time stamp (ATS) 410 is added to a 188-byte MPEG-2 transport packet 420, and thus a total of a 192-byte transport packet is used. The ATS 410 includes arrival time information. A de-multiplexer checks for the ATS 410 from the MPEG-2 transport packet 420 so that a video elementary stream (ES) is transmitted to a decoder according to the ATS 410. That is, since the de-multiplexer adjusts a data transmission rate according to the ATS 410, if the ATS 410 of video data is sporadically arranged, the video data is slowly input to the decoder. The ATS 410 corresponds to time information compliant with a data transfer standard, and has to be logically synchronized with display time information such as a presentation time stamp (PTS) and a decoding time stamp (DTS). The PTS includes reproduction time information indicating a reproduction time point. The DTS includes decoding time information indicating a decoding time point.

Figure 5:
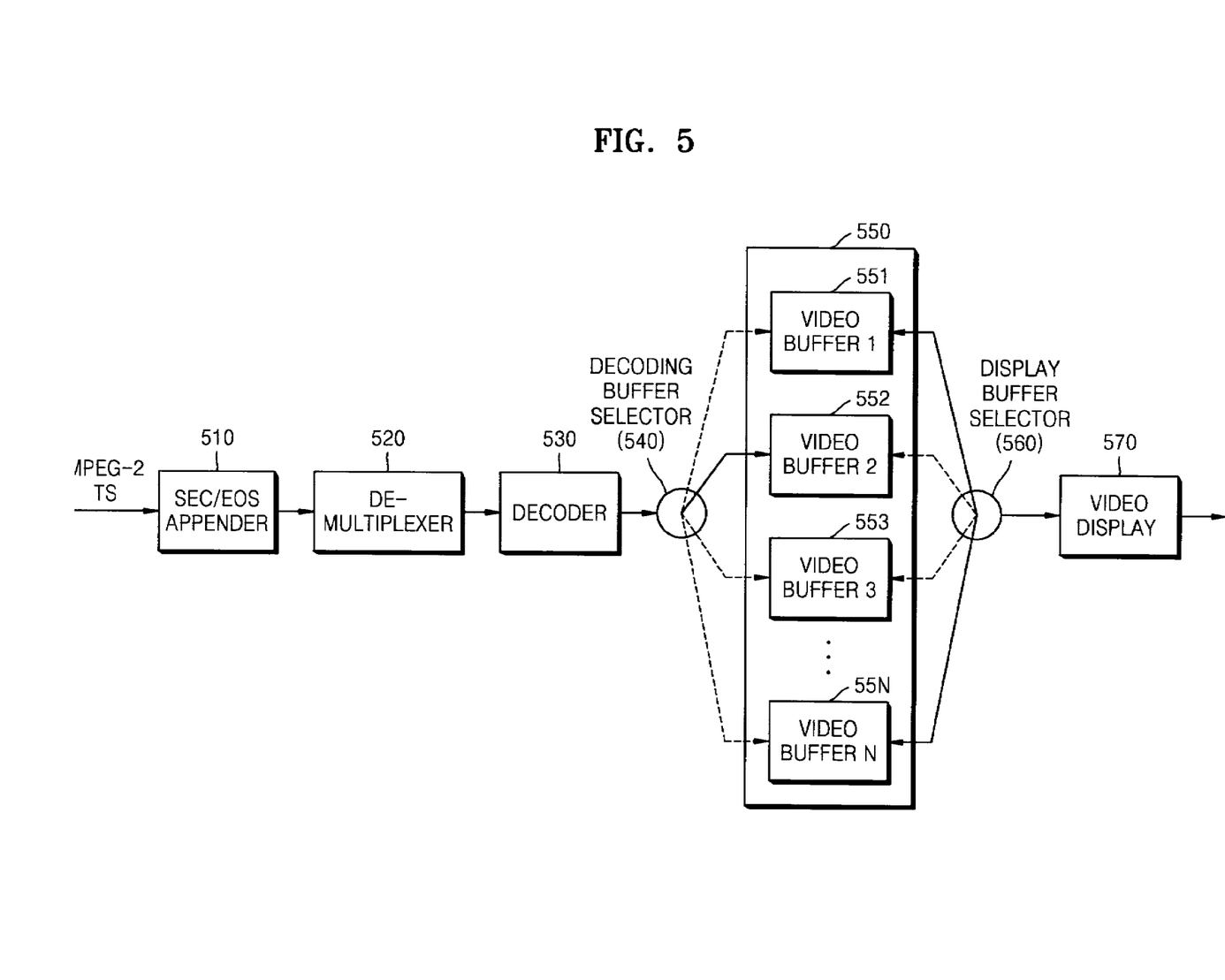
FIG. 5 is a block diagram of an apparatus for displaying an MPEG-2 TS in which an SEC/end of sequence (EOS) is appended according to an exemplary embodiment of the present invention.

FIG. 5 is a block diagram of an apparatus for displaying an MPEG-2 TS in which an SEC/EOS is appended according to an embodiment of the present invention. The apparatus includes an SEC/EOS appender 510, a de-multiplexer 520, a decoder 530, a decoding buffer selector 540, a video buffer 550, a display buffer selector 560, and a video display 570.

The SEC/EOS appender 510 receives the MPEG-2 TS including one or more video streams, and then appends an SEC/EOS so as to be appended behind a last video stream included in a stream to be displayed among the received MPEG-2 TS. Details thereof will be described below with reference to FIGS. 6 and 7A, 7B, and 7C.

The de-multiplexer 520 sequentially transmits to the decoder 530 the stream to be displayed where the SEC/EOS is appended by the SEC/EOS appender 510 according to the ATS.

The decoder 530 decodes the received stream (or video data) to be stored in any one of video buffers 551 to 55N, which is included in the video buffer 550 and is selected by the decoding buffer selector 540, thereby completing one picture.

The decoding buffer selector 540 selects any one of buffers 551 to 55N to store the decoded video data. The display buffer selector 560 selects any one of buffers 551 to 55N storing the video data to be displayed on a screen.

The video display 570 displays on the screen the video data stored in any one of buffers 551 to 55N selected by the display buffer selector 560.

For example, if a picture currently being displayed on the screen is in association with video data stored in the first video buffer 551, a pointer of the decoding buffer selector 540 indicates the second video buffer 552, and a pointer of the display buffer selector 560 indicates the first video buffer 541. The decoder 530 decodes the video data and then stores the decoded video data in the second buffer 542 indicated by the pointer of the decoding buffer selector 540. In this case, when the decoder 520 detects the head of picture or an SEC/EOS, the decoding buffer selector 540 increments its pointer by 1, thereby indicating the third buffer 553. The display buffer selector 560 also increments its pointer by 1, thereby indicating the second video buffer 552. As a result, the video data stored in the second video buffer 552 is displayed.

Figure 7C:
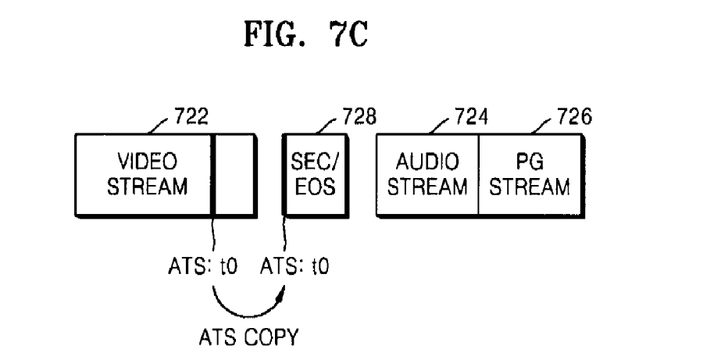

Referring to FIGS. 7A, 7B, and 7C, when a part of input stream 720 included in an input stream 710 is displayed according to the prior art, the decoder 530 decodes a last video stream 722 included in the stream 720 to be displayed and then waits until a header of a next picture or an SEC/EOS is detected. Then, the decoded video data is stored in the video buffer 550. Thus, the last video stream 722 is not displayed. That is, a display delay occurs in which certain video data is not displayed or is displayed with a time delay.

Accordingly, in the apparatus for displaying the MPED-2 TS of the present invention, the decoder 530 detects an SEC/EOS 728 immediately after the last video stream 722 is completely decoded using the SEC/EOS 728 appended by the SEC/EOS appender 510, thereby moving the pointer of the display buffer selector 560. Therefore, the video display 570 can display the decoded video data on the screen without a display delay.

By appending an SEC/EOS, display can be achieved without a display delay even in the case when the last video stream included in a stream to be displayed does not contain the SEC/EOS. Examples of such case include: (a) when decoded data corresponds to a last video stream included in a stream to be displayed; (b) when display is scheduled to end after a part of an the input stream is displayed; (c) when a next stream is scheduled to be input after the part of input stream is displayed; (d) when a new stream is scheduled to be displayed after the stream currently being displayed stops being displayed; (e) when a remote control input is scheduled to be received from a user after the part of the stream is read in a state that a decoder is operating; (f) when the user wants to stop decoder operation by detecting the completion of decoding; and (g) when video data is displayed with a time gap such as a slideshow. Alternatively, display can also be achieved without a display delay even when a stream to be displayed has a significant video gap.

Accordingly, conventional problems can be solved in which a picture is displayed with a time delay or in which the picture is refused to be displayed according to the AV sync algorithm because the last video stream included in the stream to be displayed does not contain the SEC/EOS.

Figure 6:
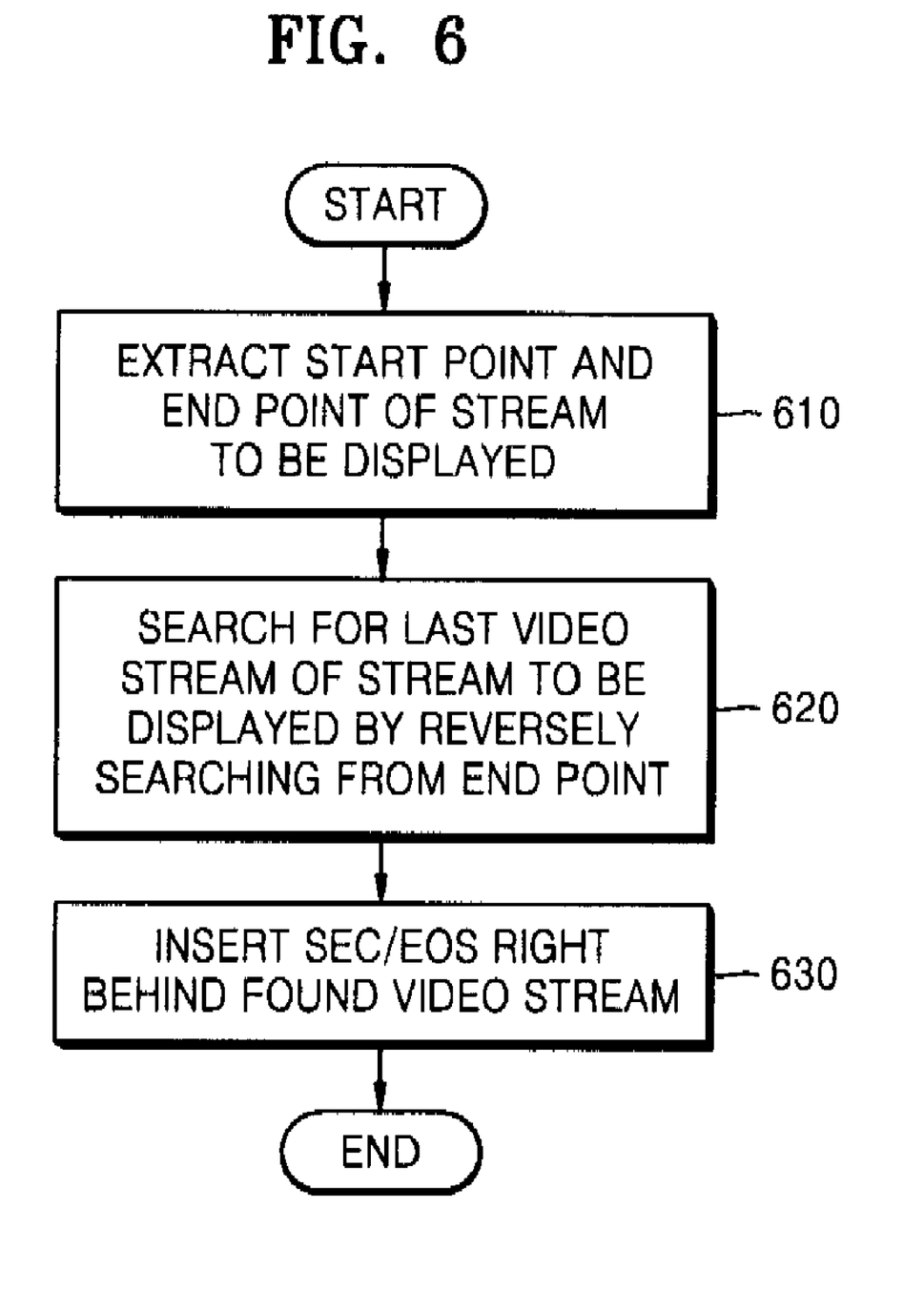
FIG. 6 is a flowchart of a method of appending an SEC/EOS according to an exemplary embodiment of the present invention.

FIG. 6 is a flowchart of a method of appending an SEC/EOS according to an exemplary embodiment of the present invention.

Referring to FIG. 6, the method of appending an SEC/EOS includes three operations as follows.

A start point and an end point of a stream to be displayed are extracted (operation 610).

Next, a last video stream is searched for by reversely searching the stream to be displayed from the end point extracted in operation 610 (operation 620).

Next, the SEC/EOS is appended right behind the found last video stream (operation 630).

FIGS. 7A, 7B, and 7C illustrate an example of a method of appending an SEC/EOS according to an exemplary embodiment of the present invention.

Referring to FIGS. 7A, 7B, and 7C, the SEC/EOS is appended into a stream which is input in the format of an MPEG-2 TS according to the flowchart of FIG. 6.

Referring to FIG. 7A, a start point 712 and an end point 714 are extracted from a stream 720 to be displayed and included in an input stream 710 that is received according to operation 610 of FIG. 6.

Referring to FIG. 7B, a video stream 722 included in a stream 720 to be processed reversely from an end point 714 extracted according to operation 620 of FIG. 6 is searched for.

Referring to FIG. 7C, an SEC/EOS 728 is appended right behind the video stream 722 according to operation 630 of FIG. 6. The ATS of the last video stream 722 may be copied to the ATS of the SEC/EOS 728. Then, the video stream 722 and the SEC/EOS 728 can be simultaneously input to the decoder 530 and be displayed on the screen while decoding.

Figure 8:
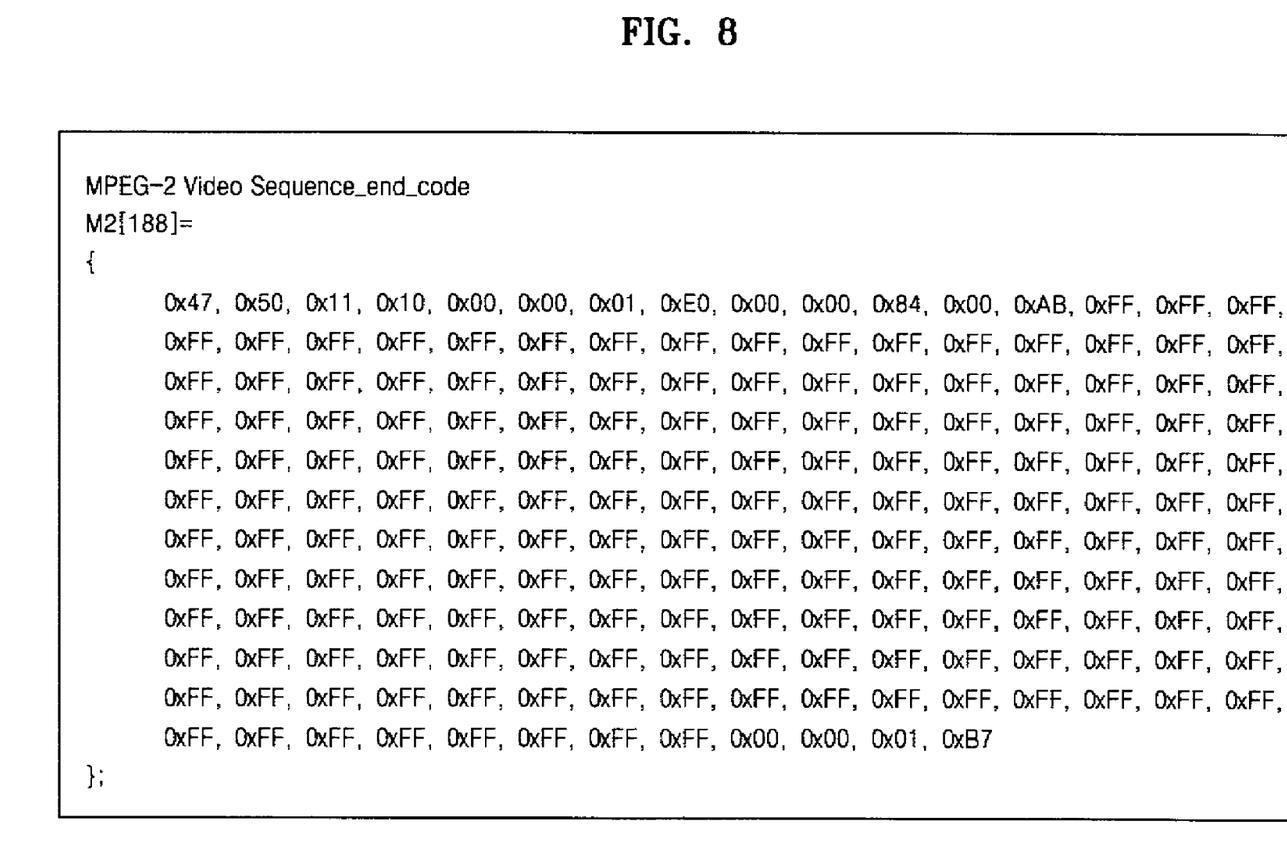
FIG. 8 illustrates an SEC/EOS in association with an MPEG-2 codec according to an exemplary embodiment of the present invention.
Figure 9:
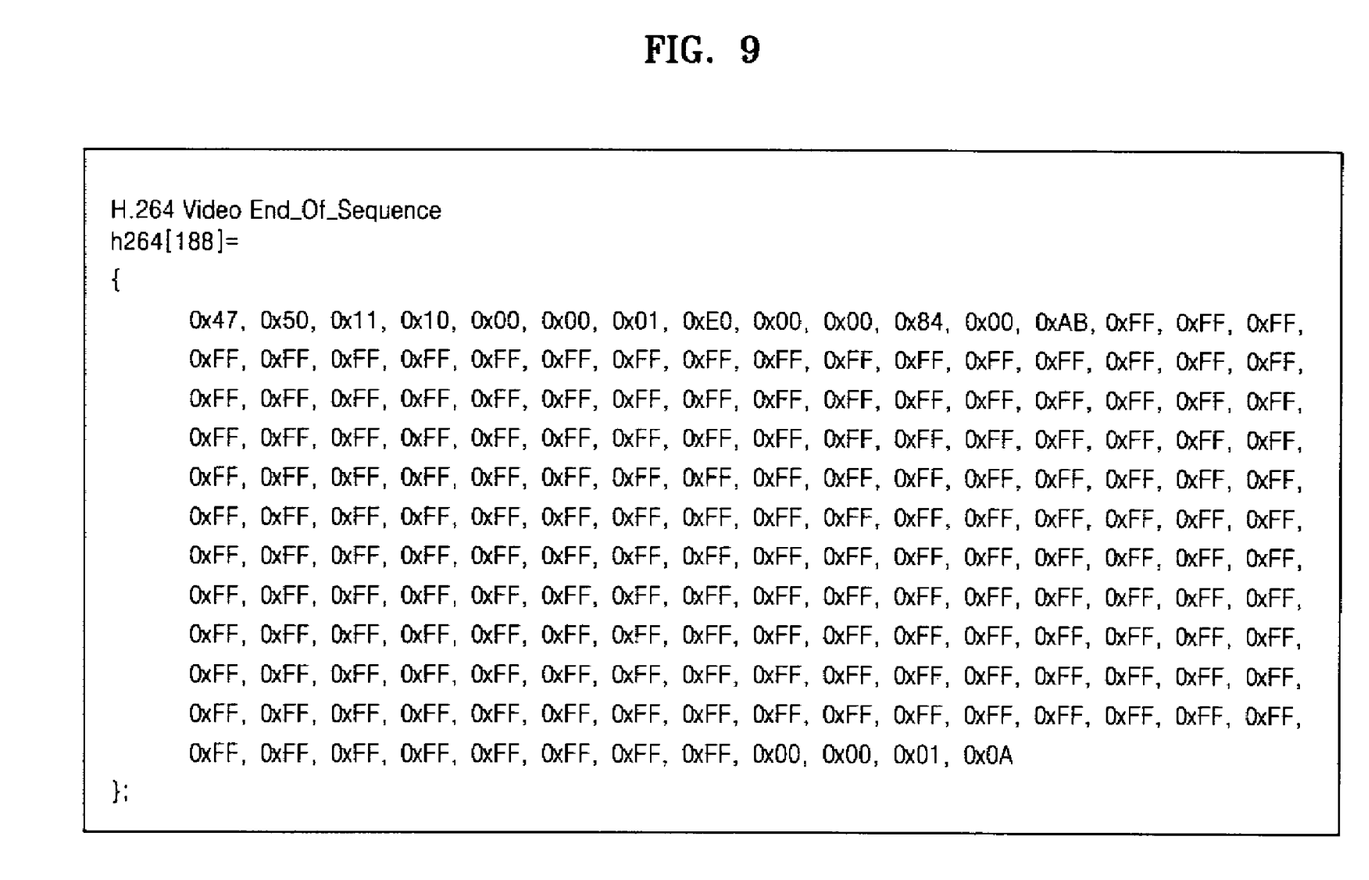
FIG. 9 illustrates an SEC/EOS in association with a H.264 codec according to an exemplary embodiment of the present invention.
Figure 10:
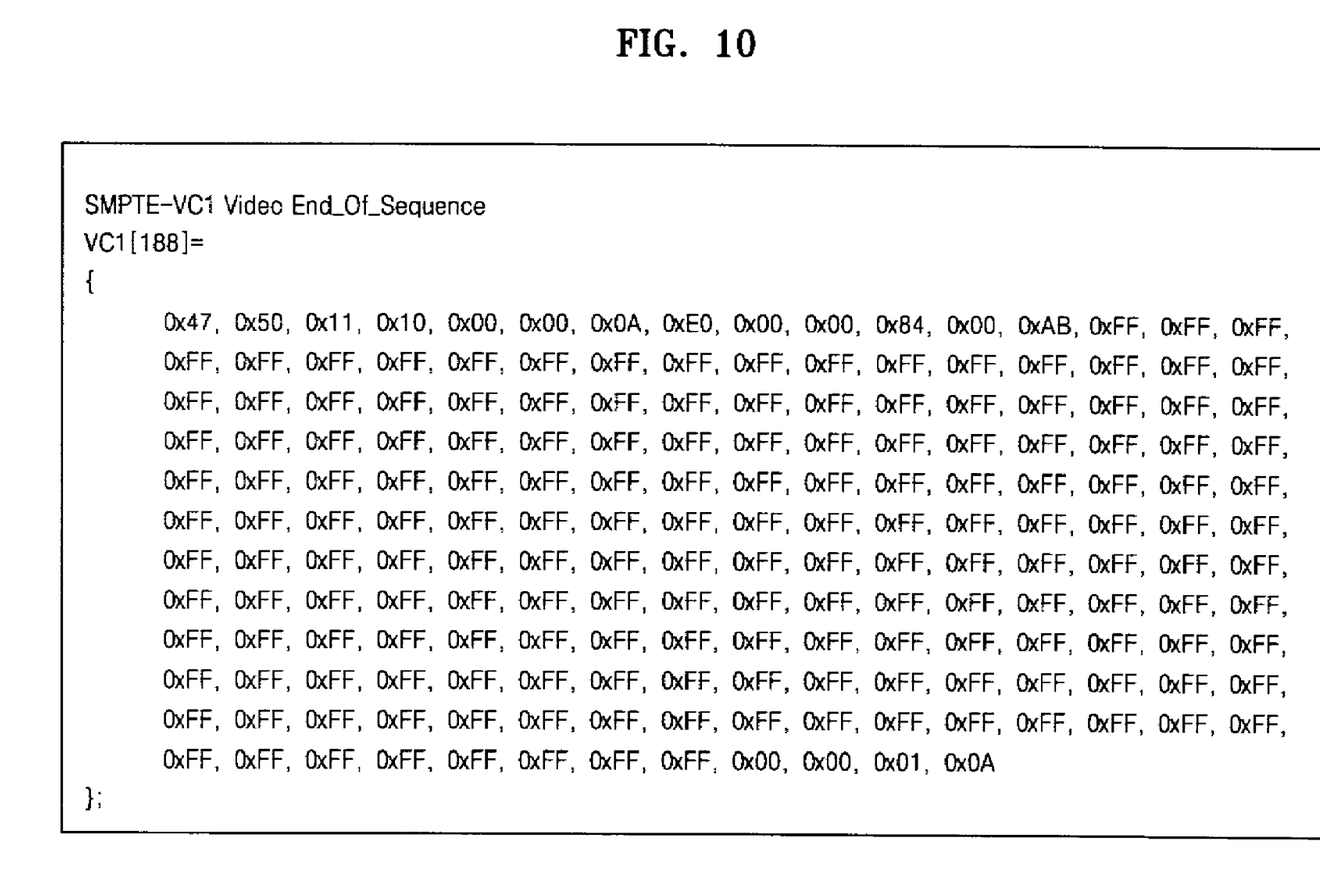
FIG. 10 illustrates an SEC/EOS in association with a video codec (VC)-1 codec according to an exemplary embodiment of the present invention.

FIGS. 8 to 10 are examples of an SEC/EOS according to codec types. A plurality of video streams are compressed in accordance with respective codec types (e.g., MPEG-2, H.264, VC-1, etc) and are packetized in the format of an MPEG-2 TS. In the present invention, the appended SEC/EOS corresponds to each codec type. The codec type is not limited thereto, and thus various other codec types may also be used.

Figure 11:
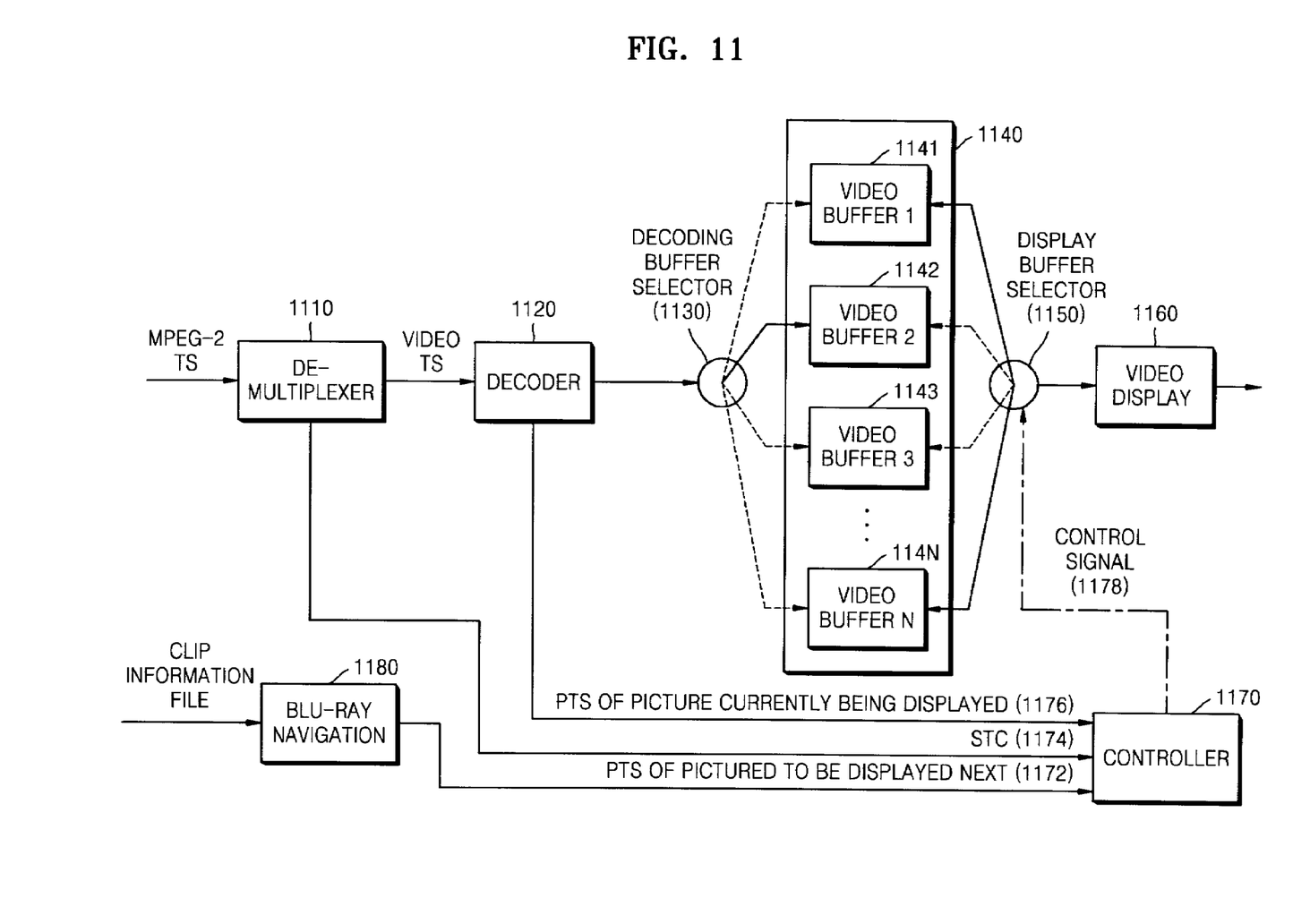
FIG. 11 is a block diagram of an apparatus for displaying an MPEG-2 TS using the difference between a system time clock (STC) and a PTS according to an exemplary embodiment of the present invention.

FIG. 11 is a block diagram of an apparatus for displaying an MPEG-2 TS using the difference between a system time clock (STC) and a PTS according to an exemplary embodiment of the present invention. System time information indicates reference time information of a system and is implemented using the STC or the like. The apparatus for displaying an MPEG-2 TS of the present invention includes a de-multiplexer 1110, a decoder 1120, a decoding buffer selector 1130, a video buffer 1140, a display buffer selector 1150, a video display 1160, a controller 1170, and a Blu-ray navigation 1180.

The de-multiplexer 1110 transmits the MPEG-2 TS that is input from a Blu-ray disc to the decoder 1120.

The decoder 1120 decodes the received video data to be stored in any one of video buffers 1141 to 114N, which is included in the video buffer 1140 and is selected by the decoding buffer selector 1130, thereby completing one picture.

The decoding buffer selector 1130 selects any one of video buffers 1141 to 114N to store the decoded video data. The display buffer selector 1150 selects any one of buffers 1141 to 114N storing the video data to be displayed on the screen.

The video display 1160 displays on the screen the video data stored in any one of buffers 1141 to 114N selected by the display buffer selector 1150.

The controller 1170 allows the video data, which is stored in the video buffer 1140, to be displayed according to a PTS value 1176 of a picture currently being displayed, a PTS value 1172 of a picture to be displayed next, and STC value. The operation of the controller 1170 will be described below in greater detail with reference to FIGS. 12 to 14.

Now, the present invention will be described under the assumption that a Blu-ray application is used. However, the present invention is not limited thereto, and thus it will be understood by those skilled in the art that the present invention can be performed through various other applications.

In the Blu-ray application according to an exemplary embodiment of the present invention, PTS value of a picture to be displayed next may be obtained using media clip information. This is because, according to the Blu-ray standard, PTS value of an I-frame to be displayed can be known because the PTS value is contained in the clip information. The Blu-ray navigation 1180 extracts the PTS value of a picture to be displayed next 1172 by using the clip information of the Blu-ray disc, and then transmits the extracted PTS 1172 to the controller 1170.

The PTS value of a picture currently being displayed 1176 is transmitted to the controller 1170 via the decoder 1120. The decoder 1120 can recognize a PTS value of a picture when decoding of the picture is completed. In this case, since the decoding of the picture currently being displayed on the screen is completed, the decoder 1120 can transmit the PTS value 1176 to the controller 1170.

STC is reference time information of the system. An STC 1174 value is transmitted to the controller 1170 via the de-multiplexer 1110. The STC value 1174 may continuously be compensated for using a program clock reference (PCR) or may be set to a PTS value of a picture that is the first picture among to be displayed. The STC value 1174 has already been synchronized. The controller 1170 compares the PTS value 1176, the STC value 1174, and the PTS value 1172 so as to determine whether a decoded picture stored in the buffer 1140 will be displayed on the screen.

Figure 12:
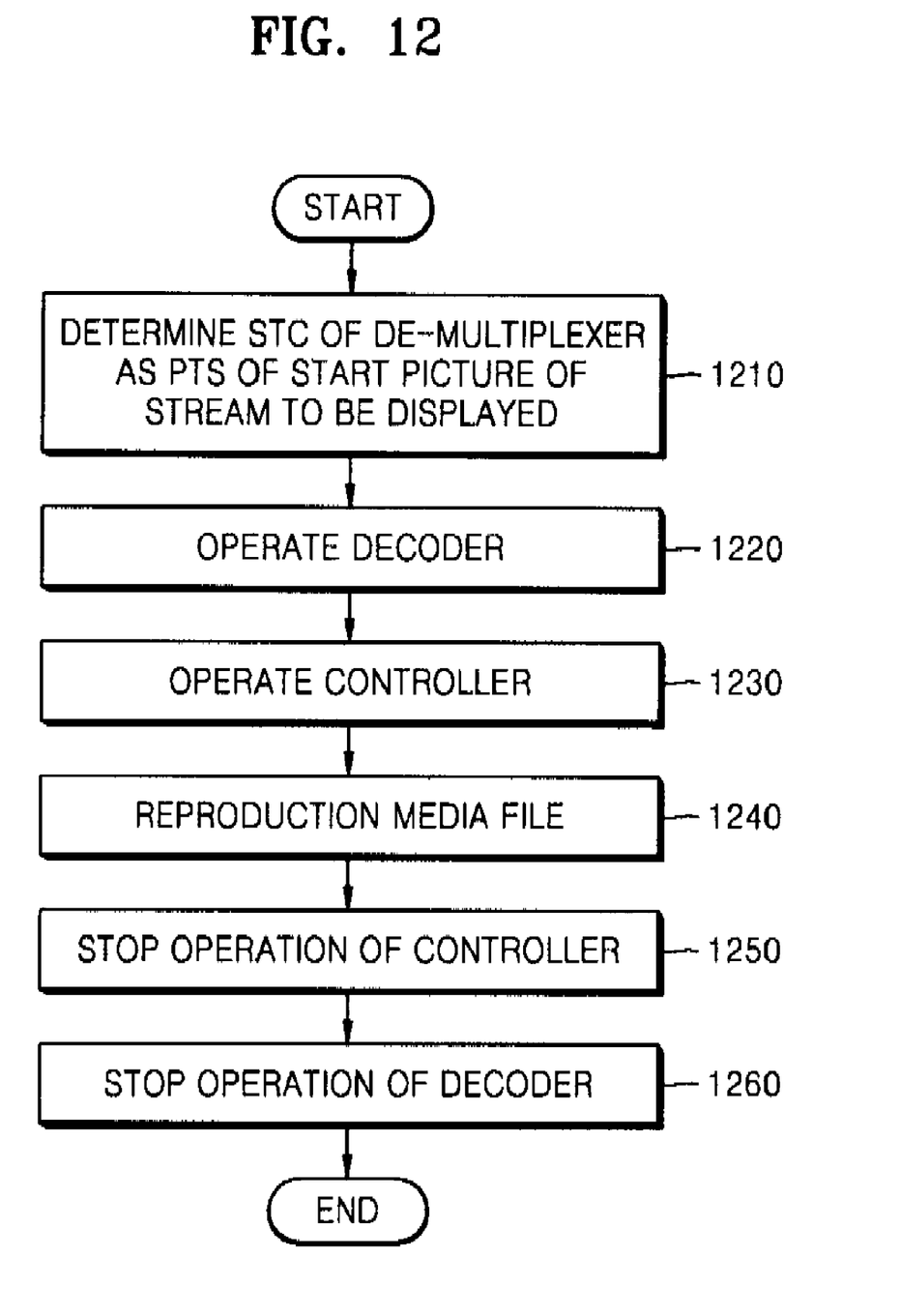
FIG. 12 is a flowchart of a method of displaying a media file according to an exemplary embodiment of the present invention.

FIG. 12 is a flowchart of a method of displaying a media file according to an exemplary embodiment of the present invention.

The method of displaying a media file includes six operations as follows.

An STC of a de-multiplexer is determined (operation 1210). In order to display video data (or media file), a plurality of pieces of system time information (e.g., STC, PTS, etc.) need to be synchronized with one another. In general, when a PCR packet is included in a stream, the STC is determined according thereto. However, in preparation for the case that the PCR packet is not included in the stream to be displayed, the STC may be determined using a PTS of a start picture of the stream to be displayed which is obtained using the aforementioned clip information. Accordingly, the STC and the PTS are synchronized with each other.

Next, decoding of the video data begins (operation 1220).

Next, the operation of a controller begins (operation 1230). The PTS may be obtained after the decoder completes decoding. Therefore, in order to obtain a current PTS, the controller may operate after decoding starts.

Next, the decoded media file is displayed (operation 1240).

Next, the operation of the controller is stopped (operation 1250).

Next, the operation of the decoder is stopped (operation 1260).

Figure 13:
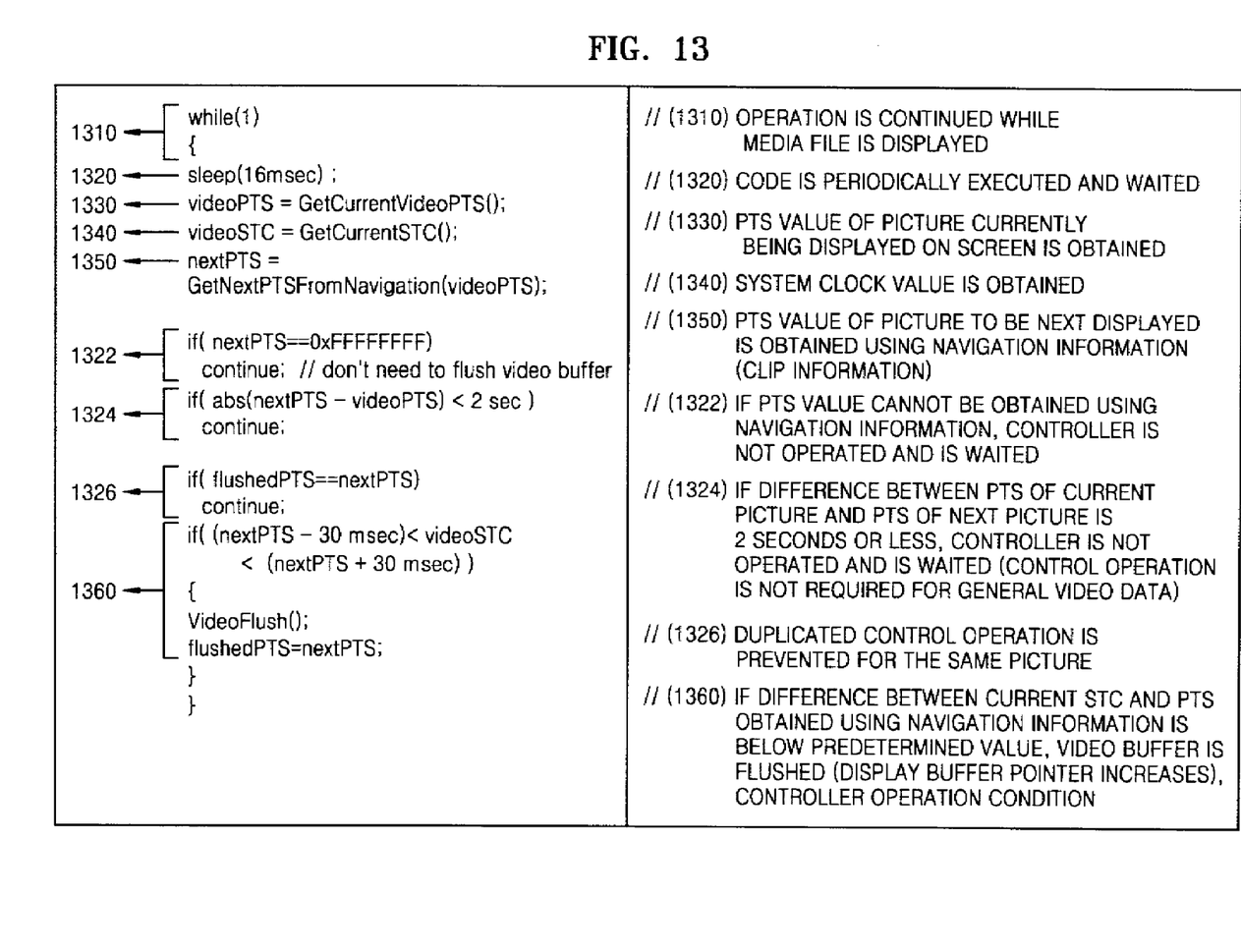
FIG. 13 is an algorithm of a method of displaying an MPEG-2 TS using the difference between an STC and a PTS according to an exemplary embodiment of the present invention.

FIG. 13 is an algorithm of a method of displaying an MPEG-2 TS using the difference between an STC and a PTS according to an exemplary embodiment of the present invention.

Referring to the algorithm of FIG. 13, when a media file (or video data) is first displayed, the controller 1170 continuously operates until the media file stops being displayed (operation 1310).

While operating, if a certain condition is satisfied (for example, the result of respective operations 1322, 1324, and 1326 is positive, or the result of operation 1360 is negative), the controller 1170 stops its operation and waits for a predetermined period of time (operation 1320).

Next, the PTS value 1176 of a picture currently being displayed is obtained (operation 1330).

Next, the STC value 1174 is obtained (operation 1174).

Next, the PTS value 1172 of a picture to be displayed next is obtained (operation 1350).

Next, if the PTS value 1172 cannot be obtained using clip information, the controller 1170 stops its operation and waits for a certain period of time (operation 1322). This is because no more pictures are deemed to be left to be displayed, and thus the controller 1170 does not need to operate.

Next, if the difference between the PTS value 1176 and the PTS value 1172 is below a predetermined value, the controller 1170 stops its operation and waits for a certain period of time (operation 1324). Though this operation, it is determined whether the video data corresponds to general video data or particular video data having a video gap. Thus, if the video data has a small video gap, the video data is regarded as the general video data. In the present exemplary embodiment, when the difference between the PTS 1176 and the PTS value 1172 is 2 seconds or less, the video data is regarded as the general video data, and as a result, the controller 1170 stops its operation and waits for a certain period of time.

Next, if the PTS 1176 is equal to the PTS value 1172, the controller 1170 stops its operation and waits for a certain period of time (operation 1326). This is to prevent a picture from being displayed again when the picture has already been displayed.

Next, if the difference between the current STC value 1174 and the PTS value 1172, which is obtained using the clip information and is in association with a picture to be displayed next, is below the predetermined value, the controller 1170 operates (operation 1360). In this operation, if the difference between the PTS value 1172 and the STC value 1174 is below the predetermined value, a picture to be displayed is regarded as not having been displayed yet. As a result, a pointer of the display buffer selector 1150 increases, and thus a next picture is displayed.

Figure 14:
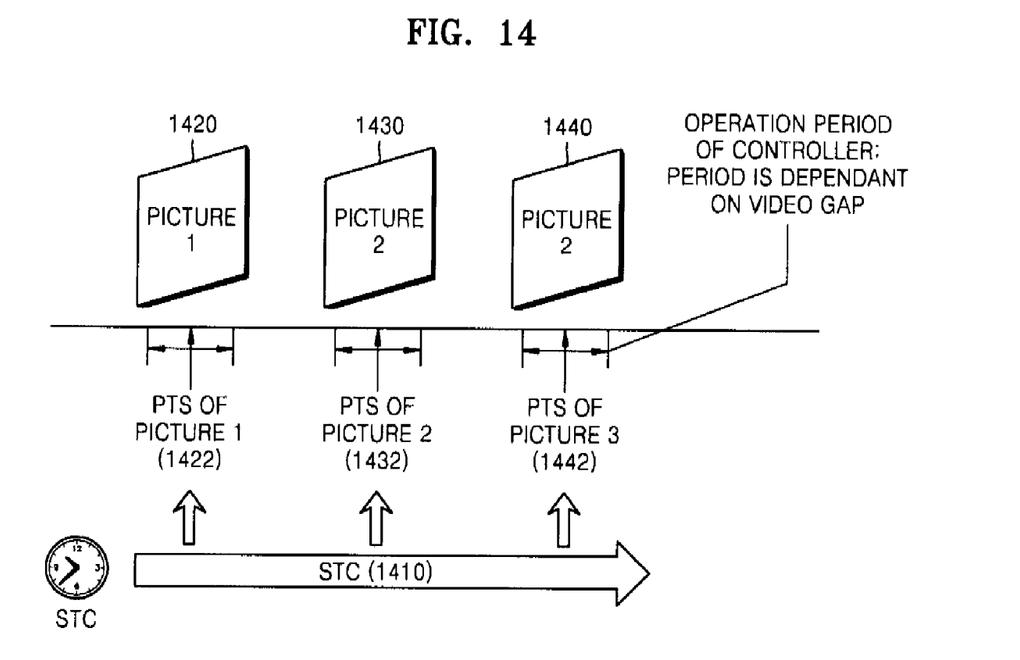
FIG. 14 illustrates an example of a method of displaying an MPEG-2 TS using the difference between an STC and a PTS according to an exemplary embodiment of the present invention.

FIG. 14 illustrates an example of a method of displaying an MPEG-2 TS using the difference between an STC and a PTS according to an exemplary embodiment of the present invention.

Referring to FIG. 14, a PTS value of a picture to be displayed is obtained using clip information as described above. If the picture with the PTS value is not displayed, the controller 1170 operates to increase a pointer of the display buffer selector 1150 of a video output terminal thereby displaying the picture on the screen. Since the Blu-ray application has a data structure having an ATS, the decoder 1120 can prevent under-buffering or over-buffering. Therefore, it is ensured that the decoder 1120 can have one or more video streams. Referring to FIG. 14, when an STC 1410 increases and thus is within a predetermined range of a picture PTS value, the controller 1170 operates to increase the pointer of the display buffer selector 1150, thereby displaying a new picture on the screen. That is, when the STC value 1410 increases and thus the difference with a PTS value 1422 of a picture 1 to be displayed next is within the predetermined range, the controller 1170 operates to display the picture 1 on the screen. Thereafter, when the STC value 1410 increases until the difference with a PTS value 1432 of a picture 2 to be displayed next is within the predetermined range, the controller 1170 operates so that the picture 1 currently being displayed is replaced with the picture 2, thereby displaying the picture 2 on the screen.

According to the present invention, a sequence end code (SEC)/end of sequence (EOS) is properly appended in an input stream without structural changes in the existing video decoder. Thus, display can be achieved normally without a display delay which occurs when only video data with some video gap is reproduced, or only a part of the input stream is reproduced.

In addition, a display error can be avoided that may occur when a stream composed of one picture cannot be displayed according to a presentation time stamp (PTS).

In another exemplary embodiment of the present invention, the invention can be embodied as computer readable codes on a computer readable recording medium.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention, but by the appended claims, and all differences within the scope will be construed as being included in the present invention.

What is claimed is:

1. A method of displaying video data, comprising: receiving an input stream;
   determining a last video stream included in a first stream, the first stream being only a part of the input stream and being a part to be displayed among the input stream;
   according to the determining, appending, behind the last video stream, a code indicating an end of stream; and
   displaying the last video stream,
   wherein when a last stream included in the first stream is not a video stream, the appending appends, behind the last video stream, the code indicating the end of stream according to the determining.

2. The method of claim 1, wherein the displaying of the last video stream comprises decoding video data corresponding to the last video stream.

3. The method of claim 2, wherein the video data is input in an MPEG-2 transport stream (TS) format.

4. The method of claim 3, wherein the video data input in the MPEG-2 TS format comprises arrival time information.

5. The method of claim 4, wherein the decoded video data is the last video stream included in the first stream to be displayed.

6. The method of claim 4, wherein the displaying is scheduled to be stopped after the first stream is displayed.

7. The method of claim 4, wherein a next stream, subsequent to the first stream, is scheduled to be input after the first stream is displayed.

8. The method of claim 4, wherein a stream, different from the first stream, is scheduled to be displayed after the first stream currently being displayed stops being displayed.

9. The method of claim 4, wherein:
   the determining comprises:
      extracting a start point and an end point of the first stream to be displayed from the first stream; and
      searching for the last video stream from the end point until the last video stream is found; and
   the appending of the code indicating the end of stream comprises:
      appending the code indicating the end of stream behind the last video stream that is found according to the searching.

10. The method of claim 9, wherein the appending of the code indicating the end of stream further comprises copying arrival time information of the last video stream to arrival time information of the appended code indicating the end of stream.

11. The method of claim 1, wherein the code indicating the end of stream is a sequence end code (SEC) or end of sequence (EOS).

12. The method of claim 11, wherein the SEC or the EOS is selected from the group consisting of an MPEG-2 SEC, a H.264 EOS, and video codec-1 (VC) EOS according to a video codec.

13. The method of claim 1, wherein the determining comprises searching for the last video stream included in the first stream until the last video stream is found.

14. An apparatus for displaying video data, comprising:
   a code appender which determines a last video stream included in a first stream, the first stream being only a part of a received input stream and being a part to be displayed among the input stream, and which appends, behind the last video stream, a code indicating an end of stream according to the determining; and
   a display displaying the last video stream appended with the code indicating the end of stream,
   wherein when a last stream included in the first stream is not a video stream, the code appender appends, behind the last video stream, the code indicating the end of stream according to the determining.

15. The apparatus of claim 14, wherein the apparatus is a Blu-ray disc apparatus.

16. The apparatus of claim 14, further comprising a decoder decoding video data corresponding to the last video stream appended with the code indicating the end of stream.

17. The apparatus of claim 16, wherein the video data is input in an MPEG-2 transport stream (TS) format.

18. The apparatus of claim 17, wherein the video data input in the MPEG-2 TS format comprises arrival time information.

19. The apparatus of claim 18, wherein the decoded video data is the last video stream included in the first stream to be displayed.

20. The apparatus of claim 19, wherein the displaying is scheduled to be stopped after the first stream is displayed.

21. The apparatus of claim 20, wherein a next stream, subsequent to the first stream, is scheduled to be input after the first stream is displayed.

22. The apparatus of claim 21, wherein a stream, different from the first stream, is scheduled to be displayed after the first stream currently being displayed stops being displayed.

23. The apparatus of claim 18, wherein the code appender extracts a start point and an end point of the first stream to be displayed from the first stream, searches for the last video stream from the end point, and appends the code indicating the end of stream behind the last video stream that is found according to the searching.

24. The apparatus of claim 23, wherein the code appender comprises a copy unit which copies arrival time information of the last video stream to arrival time information of the appended code indicating the end of stream.

25. The apparatus of claim 14, wherein the code indicating the end of stream is a sequence end code (SEC) or end of sequence (EOS).

26. A non-transitory computer-readable medium having embodied thereon a computer program for executing a method of displaying video data, the method comprising:
   receiving an input stream;

determining a last video stream included in a first stream, the first stream being only a part of the input stream and being a part to be displayed among the input stream;
according to the determining, appending, behind the last video stream, a code indicating an end of stream; and
displaying the last video stream,
wherein when a last stream included in the first stream is not a video stream, the appending appends, behind the last video stream, the code indicating the end according to the determining.

* * * * *